(12) United States Patent
Doutre et al.

(10) Patent No.: US 12,004,048 B2
(45) Date of Patent: Jun. 4, 2024

(54) COMMUNICATION SYSTEM AND METHOD FOR COOPERATIVE PRESS PARTICIPATION AT AN INCIDENT SCENE

(71) Applicant: MOTOROLA SOLUTIONS, INC., Chicago, IL (US)

(72) Inventors: Barbara R Doutre, Plantation, FL (US); Sean Regan, Boca Raton, FL (US); James D Barrus, Coral Springs, FL (US); Stephen B Einbinder, Sunrise, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 434 days.

(21) Appl. No.: 17/645,217

(22) Filed: Dec. 20, 2021

(65) Prior Publication Data
US 2023/0199433 A1  Jun. 22, 2023

(51) Int. Cl.
*H04W 4/029* (2018.01)
*H04W 4/90* (2018.01)
*H04W 48/04* (2009.01)
*H04W 8/06* (2009.01)

(52) U.S. Cl.
CPC ............ *H04W 4/029* (2018.02); *H04W 4/90* (2018.02); *H04W 48/04* (2013.01); *H04W 8/06* (2013.01)

(58) Field of Classification Search
CPC ....... H04W 4/029; H04W 4/90; H04W 48/04; H04W 8/06; H04W 4/021
See application file for complete search history.

(56) References Cited

U.S. PATENT DOCUMENTS

| 7,191,934 | B2 | 3/2007 | Miller et al. |
| 10,198,034 | B2 | 2/2019 | Ivanovic et al. |
| 2005/0017070 | A1* | 1/2005 | Miller ............... G06K 17/00 235/380 |
| 2007/0240198 | A1* | 10/2007 | Kander ............. H04L 63/0853 726/2 |
| 2021/0400424 | A1* | 12/2021 | Bontempo ............ H04W 4/021 |

* cited by examiner

*Primary Examiner* — Marcos L Torres
(74) *Attorney, Agent, or Firm* — Barbara R. Doutre

(57) ABSTRACT

A communication system, apparatus, and method are provided including a portable public safety (PS) radio that scans a portable non public safety (non-PS) communication device having electronic press credentials stored therein. A server temporarily registers the portable non-PS communication device and electronic press credentials. The server monitors movement of the temporarily registered device for boundary violations within a public safety incident scene, and communicates a warning to the temporarily registered device in response to boundary violations. Electronic press scores are saved and used as a basis to determine access to future registration requests at future incident scenes.

16 Claims, 3 Drawing Sheets

COMMUNICATION SYSTEM AND METHOD FOR COOPERATIVE PRESS PARTICIPATION AT AN INCIDENT SCENE

BACKGROUND

Numerous people may be present at a public safety incident scene, such as first responders, victims, witnesses, members of the press, and bystanders. Many incident scenes require care to preserve evidence, attend to medical needs of the victims, and gather witness testimony. In larger incidents, particularly those which may have on-going safety concerns, nearby areas may be temporarily used to attend to victims and witnesses.

The media plays an important role in society, providing a source of information to the public so as to raise awareness to current events. However, media journalists may not have access to an incident scene and may face issues when attempting to interview and report on an incident. Frustration between the media and first responders may arise, particularly when dealing with large incident scenes involving numerous people spread over different areas or sites.

Accordingly, it would be desirable to provide an improved technical approach to managing an incident scene which would improve media access while preserving public safety.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
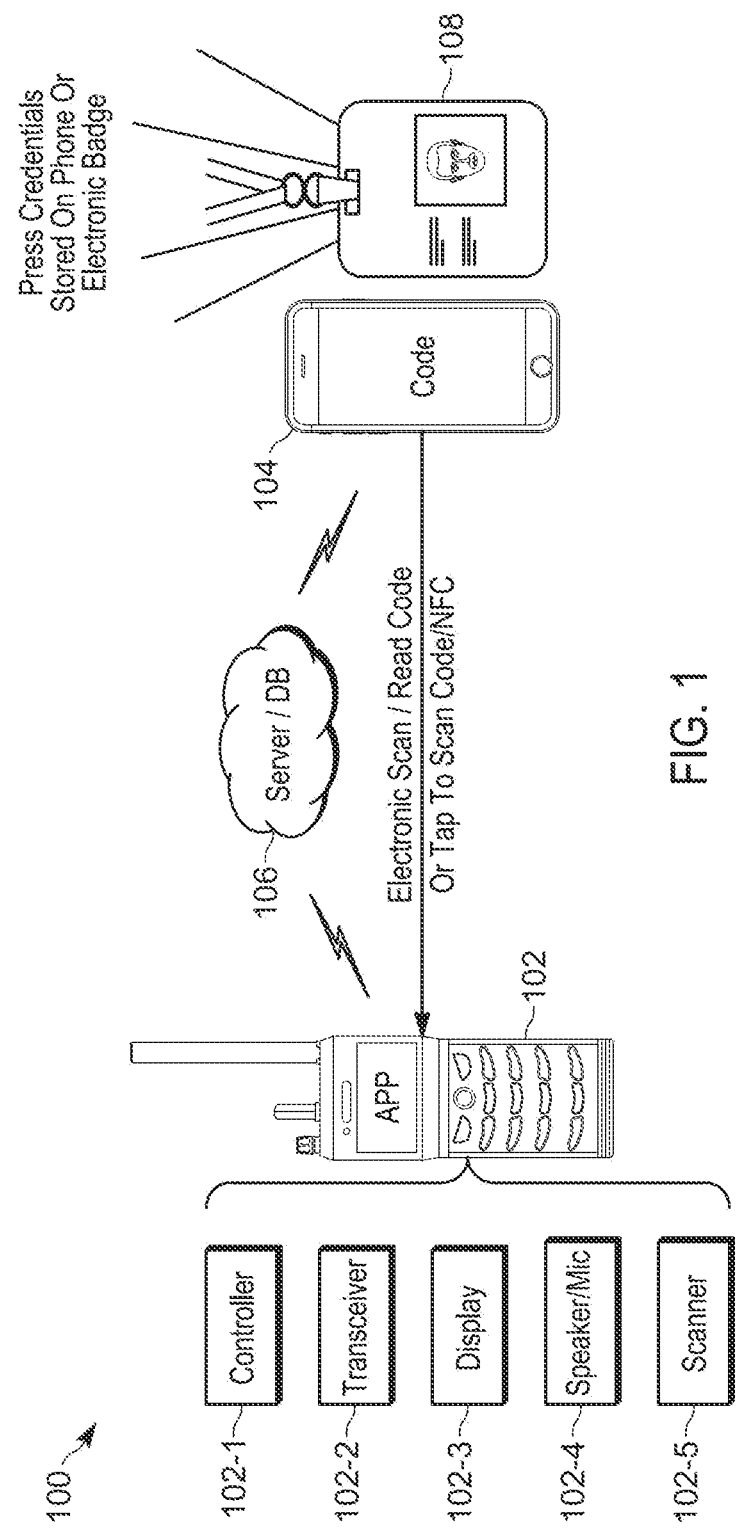
FIG. 1 illustrates a communication system formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Briefly, there is provided herein a communication system, apparatus, and technical method to improve cooperative press participation at a public safety incident scene.

In accordance with an example embodiment, a method for press and public safety agencies to interoperate, comprises: presenting an electronic press pass having electronic press credentials stored therein upon entry to a public safety incident scene, the electronic press pass being associated with a portable non-public safety (non-PS) communication device; scanning the electronic press pass, using a scanning function of a portable public safety (PS) radio; verifying, by a server, that the electronic press credentials are acceptable for access to an approved zone of the public safety incident scene; temporarily registering the portable non-PS communication device and electronic press credentials with the server for access to the approved zone as a temporarily registered device; determining, by the server, if a location of the temporarily registered device has crossed a boundary into a keep-out zone of the public safety incident scene; and sending a boundary warning from the server to the temporarily registered device with instructions to relocate to the approved zone. The server may alert the portable PS radio that a boundary warning has been sent to the temporarily registered device. The electronic press pass may include an electronic badge having the electronic press credentials stored therein, and the portable non-PS communication device may be one of: a cell phone, a tablet, or a laptop. Alternatively, the electronic press pass with electronic press credentials may be stored directly within the portable non-PS communication device, and the portable non-PS communication device may be one of: a cell phone, a tablet, or a laptop. The temporarily registered device may grant permission to the server to monitor location while operating within the public safety incident scene. The method may further include alerting the portable PS radio of the boundary warning sent to the temporality registered device which may further include a recommendation action based on a severity level of the boundary warning. The method may further include tracking boundary violations and non-violations over time using the server; and storing analytics on the tracked violations and non-violations within a public safety database associated with the server. The method may further include assigning different warning levels for each boundary violation, wherein the warning level may be based on time of the temporarily registered device inside the keep-out zone. The method may further include updating press credentials with a historical data score based on a tracked history of violations and non-violations. The method may further update a public safety database with the historical data score based on tracked history of violations and non-violations. The verifying of the press credentials may be based on a historical press pass score. The public safety incident scene may be electronically mapped showing the approved zone and the keep-out zone separated by a boundary. Updated boundaries and zones may be communicated to the temporarily registered device.

In accordance with an example embodiment, a portable public safety radio comprises a mapping feature for electronically mapping an approved zone, a boundary, and a keep-out zone of a public safety incident scene; a scan feature for wirelessly scanning press credentials stored in a portable non public safety (non-PS) communication device, the portable non-PS communication device seeking access to the public safety incident scene; a transmitter for transmitting the press credentials and the mapping of the public safety incident scene to a server, such as a cloud based server, the server performing verification and analytics on the press credentials to grant temporary registration of the non-PS communication device, as a temporarily registered device, to the approved zone of the public safety incident scene. The portable public safety radio may further receive an alert from the cloud based server when the temporarily registered device crosses the boundary into the keep-out zone of the public safety incident scene. The alert may further be accompanied by a recommendation action based on the severity of the boundary violation.

In accordance with another example embodiment, a communication system comprises a portable public safety (PS) radio having a scanner for scanning electronic press credentials of a portable non public safety (non-PS) communication device; and a server for temporarily registering the portable non-PS communication device and for storing the electronic press credentials, the server monitoring the portable non-PS communication device for boundary violations within a public safety incident scene, the server communicating a boundary violation warning to the temporarily registered device in response to a boundary violation. The boundary violation warning may be configured based on a severity level of the boundary violation. The further may further communicate the boundary violation to the portable public safety radio when the boundary violation is above a predetermined severity level. The server may perform analytics to generate a press pass score based on current and past boundary violations and stores the score within a database. The press pass score may be updated over different public safety incidents over time. The public safety incident scene may be electronically mapped with at least one approved zone, at least one keep-out zone and at least one boundary. Updates to the electronically mapped incident scene may be made and communicated to the temporarily registered communication device.

Each of the above-mentioned embodiments will be discussed in more detail below, starting with example system and device architectures of the system in which the embodiments may be practiced, followed by an illustration of processing blocks for achieving an improved technical method, device, and system for electronic verification, registration and monitoring of portable non-public safety press communication devices to enable press access to approved zones within a public safety incident scene and maintaining separation from keep-out zones within the public safety incident scene.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Figure 2:
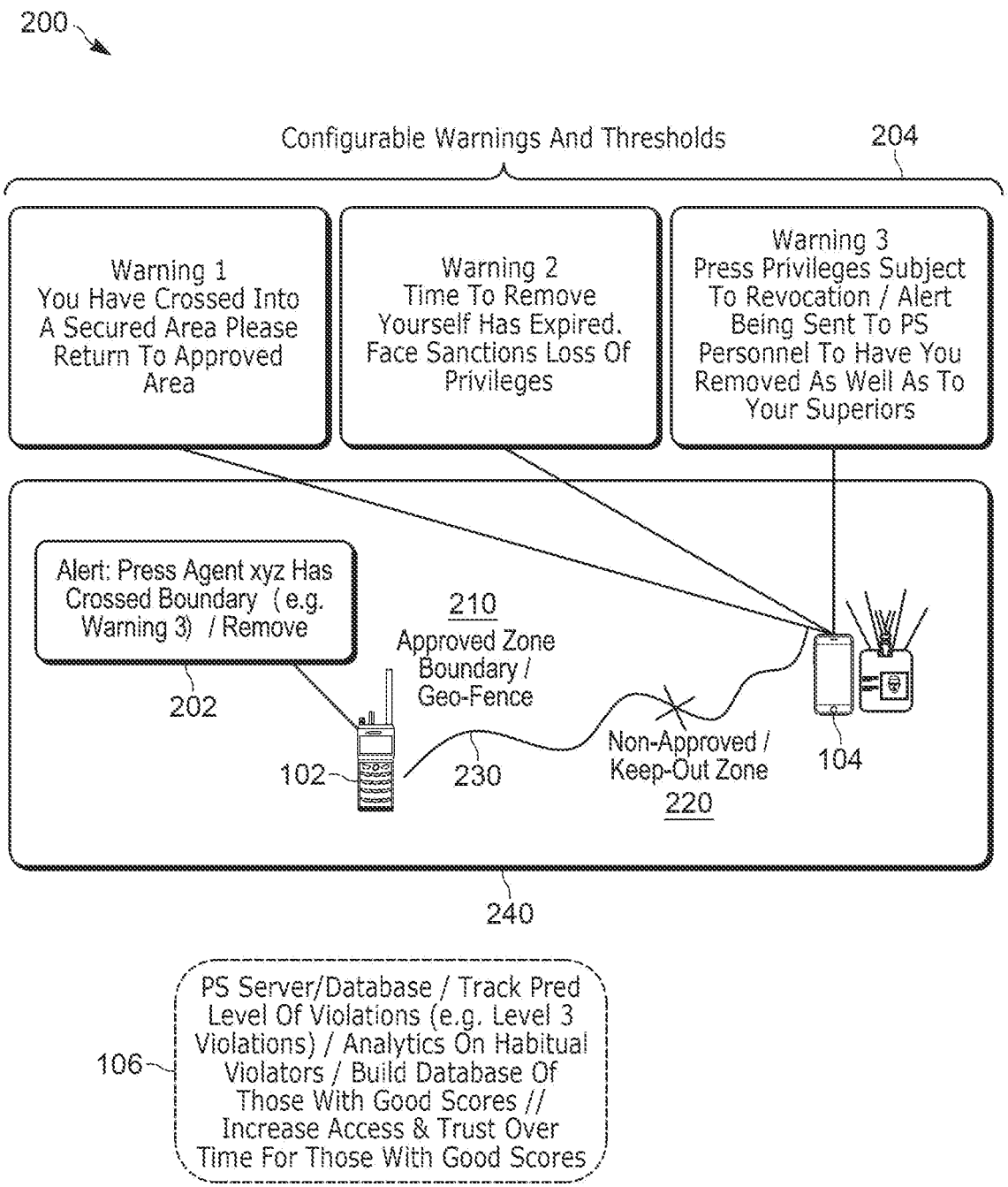
FIG. 2 is a block diagram depicting example functions and boundaries provided by the communication system in accordance with some embodiments.

FIG. 1 illustrates a communication system 100 formed and operating in accordance with some embodiments. FIG. 2 is a block diagram depicting a use case example 200 for the communication system in accordance with some embodiments. Referring to FIGS. 1 and 2, communication system 100 includes a portable public safety (PS) radio 102 communicating with a public safety server 106 with database associated therewith, as part of a public safety agency network. For example, the portable PS radio 102 may be operated by a law enforcement officer at a public safety incident scene, such as public safety incident scene 240, shown in FIG. 2.

In accordance with the embodiments, non public safety (non-PS) personnel, for example by a press agent, operating a portable non-PS communication device 104 may seek to gain access to the public safety incident scene 240 for the purposes of performing media related reports. The portable non-PS communication device 104 may be a cell phone, a tablet, a portable laptop or the like having press credential stored therein, wherein the electronic press credentials pertain to the user carrying the device, such as user ID, press agency, user photograph and the like. The press credentials are scannable or readable features capable of being scanned by the portable PS radio 102. Electronic press credentials, in some embodiments, may also be stored on an electronic badge 108 (a passive device), when used in conjunction with an active device, such as a cell phone, tablet, or laptop as will be described later. While law enforcement attending to the scene may not allow entire access to the public safety incident scene 240, there may be a desire to permit access to some approved areas. The portable PS radio 102 and server 106 are advantageously used for verification of the press credentials of the portable non-PS communication device to enable access to some regions of the incident scene 240 (referred to as approved zone 210), while limiting access to other regions (referred to a keep-out zone 220).

The mapping of the incident scene 240 may be set-up, configured and managed by portable PS radio 102 and server 106 to define approved zone(s) 210, keep-out zone(s) 220 and one or more boundaries 230. The zone coordinates for a current public safety scene may be electronically mapped using portable PS radio 102 and server 106, and saved within the database of server 106. For example using geofencing technology can be used to create a virtual perimeter, and/or any suitable electronic mapping application that generates virtual boundaries may be used to define the approved zone(s) and keep-out zone(s) of the public safety incident scene 240. The database associated with server 106 may incorporate previously saved maps and zones from previous incidents, for potential use in future incidents that may occur at the same location. The map showing the approved zone(s) and keep-out zone(s) may be overlaid, for example, on a map of the incident scene 240 and transmitted from the server 106 to the portable non-PS communication device 104. The device may already have a corresponding mapping application for reading the map or the mapping application may be sent to the non-PS device from server 106 as part of a temporary registration.

As an example, an officer attempting to facilitate victim triage transfers from a building to a triage area of the incident scene 240 may specify an area as keep-out zone 220, while the remaining area bounded (by boundary 230) may be permissible for access by the press, such as approved zone 210. Because of the proximity of the keep-out zone 220 to the approved zone 210, it is desirable to provide access to press agents to the approved zone, without negatively impacting or impeding medical aid to victims or interference with witness statements which may be taking place in the keep-out zone.

In some embodiments, the electronic press credentials stored within portable non-PS communication device 104 may be accessed via a code, the code being for example a QR-code or some other scannable or wirelessly readable feature of the device for accessing the press credentials. The code may be displayed on a display of the portable non-PS communication device 104 and presented by the press agent to the law enforcement officer who then uses his/her portable PS radio 102 to scan/read the code. Alternatively, near field communications (NFC) can be used for the wireless scanning, wherein an officer can simply tap his/her portable PS radio 102 to the press pass of portable non-PS communication device 104 without opening an app—since NFC tags have a descriptor that the radio's Operating System (OS) can use to auto-launch the appropriate internal app to do the processing. Alternatively, portable PS radio 102 may include a selectable application (app) feature to trigger the scanning or reading the code of portable non-PS communication device 104. In some embodiments, the electronic press credentials may be stored on the electronic badge 108, and scanned using NFC (via a tap), QR-code scan, bar code scan or other suitable scan means. The electronic badge will also have stored therein contact information for an active communication device associated with the press agent, such as a cell phone, a tablet or laptop, which can receive mapping information pertaining to the zones and messages from the server 106, such as alerts.

The portable PS radio 102 transmits the press credentials, obtained via the scan, to the server 106, where verification and analytics are run to determine whether the press credentials are acceptable for access to the approved zone 210 of the public safety incident scene 240. An acceptability threshold may be established to determine approval for access to the approved zone 210. If accepted, the server 106 temporarily registers the portable non-PS communication device 104 and press pass credentials as being accepted for the approved zone 210. If the credentials are deemed acceptable, the server 106 temporality registers the portable non-PS communication device 104 as being approved for access to the approved zone 210. As part of the registration process, permissions are granted by the temporarily registered device to the server 106 for the server to monitor the location of the temporarily registered device while the device is operating within the public safety incident scene. The approved zone within the public safety incident scene is communicated by the server 106 to the temporarily registered portable non-PS communication device 104. For example, an electronic map indicating boundaries, potential landmarks (e.g. backyard is an approved zone, front yard is a keep-out zone, streets, etc) may be communicated from the server 106 to the portable non-PS communication device 104, preferably to be displayed on a display of the device.

The server 106 further monitors the location of the temporarily registered portable non-PS communication device 104 to determine if a crossing of the boundary 230 has occurred. If such a boundary violation has occurred, the server 106 sends a boundary violation warning (e.g. over LTE) to the temporarily registered portable non-PS communication device 104 with instructions to relocate to the approved zone 210.

Depending on a severity level of the boundary violation, the server 106 may further alert the portable PS radio 102 to the violation with an action recommendation, such escorting the registered user away from the public safety incident scene. The server 106 performs analytics to generate a press pass score based on current and past boundary violations and stores the score within the database. The scores can be built up over time over various public safety incident scenes. The acceptability threshold, used to determine accessibility approval for entry into the approved zone, may be based on a press pass score threshold. Press pass scores with a predetermined number of violations may be denied access to the approved zone 210, while others with fewer or no violations may be granted faster access to the approved area.

Operationally, the portable PS radio 102 includes a controller 102-1, one or more transceivers 102-2, user interfaces such as display 102-3, a speaker and microphone 102-4, and scanner 102-5. The transceivers 101-2 may include one or more long range radio communications transceiver(s), for example converged LMR/LTE transceivers, and a short range wireless transceiver, such as a near field communications (NFC) transceiver, UWB transceiver, or the like.

The controller 102-1 of portable PS radio 102 includes one or more processors configured to manage radio communications (e.g. LMR, LTE, NFC, etc). In accordance with the embodiments, the controller of portable PS radio 102 is further configured to scan the press pass feature of the portable non-PS communication device 104, using the short range wireless transceiver, thereby acquiring the press credentials. The scanned electronic press credentials (which may include a user press ID, press agency, photograph, and the like) are transmitted, using long range wireless radio communications, such as over LTE, from the portable PS radio 102 to the server 106 for verification, analytics and storage.

The portable PS radio 102 may wirelessly communicate to the server 106, such as a cloud based server using one or more communication technologies, such as land mobile radio communications (LMR), long term evolution communications (LTE), and the like. The portable PS radio 102 and server may electronically map, using available mapping technologies, one or more approved zones, one or more keep-out zones and one or more boundaries within the public safety incident scene, as previously described. For example, some portions of a public safety incident scene may be designated as acceptable for press access, such as public relations crisis communication areas or areas deemed "cleared" of any potential threats, while other areas may be designated as keep-put zones, such as a triage area where victims are being tended to, an area where victim statements are being taken, and other areas where potential threats have not been cleared, to name a few.

Again, the public safety server 106 may track violations and generate a press pass score. The scores can be built up over time over various public safety incident scenes. If the portable non-PS communication device 104 crosses the boundary 230 into a non-approved, keep-out zone 220, the server 106 may generate one of a plurality of warnings. The warnings may be configurable based on, for example, incident type, incident size, incident severity, and number of boundary violations that have occurred during the current incident scene and past incident scenes, and/or number of boundary violations over time.

The warning may be configured to include an action, such as return to approved area, to allow the press an opportunity to correct a location if they have moved into a keep-out zone 220 by mistake. Depending on the severity level of the boundary violation, the server 106 may further communicate a boundary violation alert to the portable PS radio 102, along with a recommended action. For example, remove registered portable non-PS communication device 104 from zone 210.

At 204, a plurality of example warning levels are shown, which may be communicated by the server 106 to the portable non-PS communication device 104 in response to a boundary violation. For example, a first warning (audio and/or display) may indicate the portable non-PS communication device 104 has crossed a boundary of into keep-out zone and with instructions to return to the approved area. A second warning may be communicated if the non portable non-PS communication device 104 again crosses the boundary 230 into the keep-out zone 220 (or does not leave after the first warning). This warning may be elevated in severity to further warn the user that he/she may face sanctions and loss of access privileges. A third higher severity warning may indicate that press privileges will be denied in the future if the user of portable non-PS communication device 104 does not return to the approved zone. The portable PS radio 102 may also receive an alert from server 106 that press agent associated with portable non-PS communication device 104 has crossed a boundary with a third level warning and should be removed from the premises. Additional notifications can be communicated to superiors of law enforcement and/or the press agency.

Again, the server 106 performs analytics to track violations and non-violations, so that both habitual violators and those with good scores can be identified. The analytics performed by server 106 enable the generation of press pass scores based on the current incident scene and past boundary violations from past incident scenes. The server 106 stores the score within its corresponding database. A press pass score may be updated over different public safety incidents. Hence, future registration attempts by a portable non-PS communication device having a press pass score that falls outside of the predetermined score threshold may be denied access to an approved zone and a portable non-PS communication device with a press pass score that falls within a predetermined score threshold will be temporarily registered and permitted access to an approved zone within a public safety incident scene.

Again, the press pass scores may be used to provide faster access to future incident scenes will be granted to those identified with good scores. Habitual violators may be denied access to future public safety incident scenes entirely or temporarily for a period of time. Scores may be reset for habitual violators, for example, with boundaries and zones that are more restrictive than those with good scores, until a score can be built back up to an acceptable score.

Figure 3:
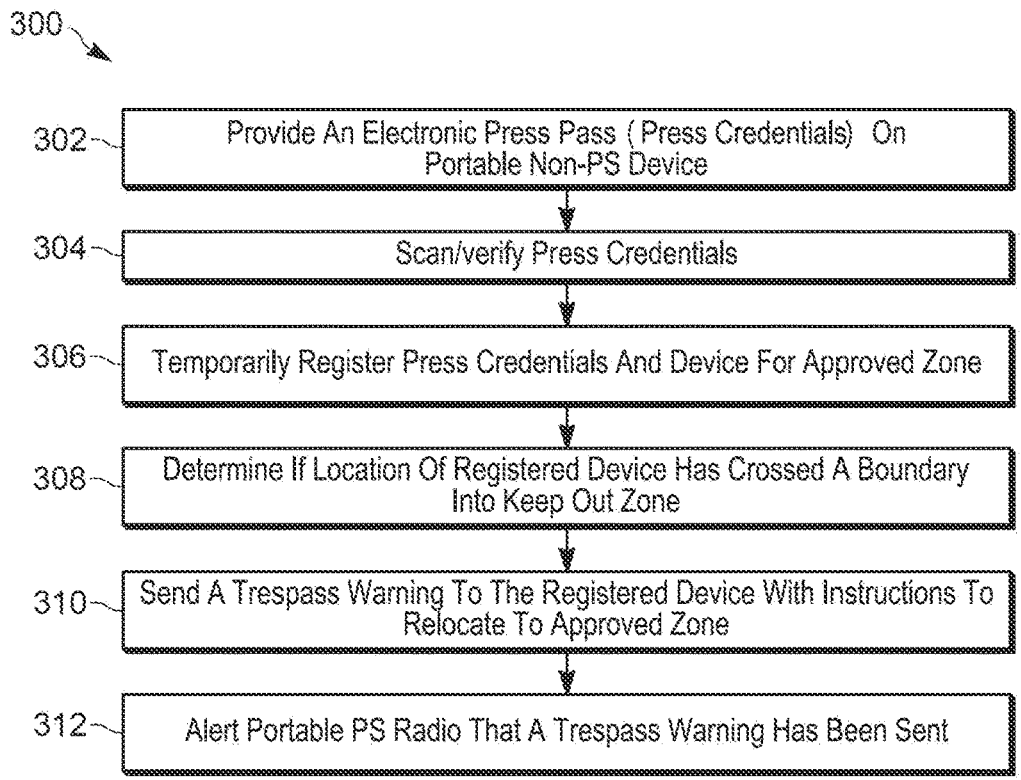
FIG. 3 is a flowchart for a method of managing access to a public safety incident scene in accordance with some embodiments.

FIG. 3 is a flowchart for a method 300 for press and public safety agencies to interoperate at an incident scene in accordance with some embodiments. At 302, the method begins by presenting electronic credentials of a press agent seeking entry to a public safety incident scene. The electronic press credentials are scannable and may be provided on a portable non-PS communication device, such as portable non-PS communication device 104 of FIG. 1, or on an electronic badge such as badge 108 described in FIG. 1. In some embodiments, the portable non-PS communication device may be, for example, a cell phone, a tablet, a laptop or other active communication device within which electronic press credentials may be stored and scanned. In other embodiments, the electronic badge (passive device) associated with an active device, such as a cell phone, a tablet, or a laptop may be used. As previously described, the electronic press credentials may include user ID, press agency, photograph, cell number and/or other parameters associated with the press agent.

The press credentials may be scanned at 304 by the portable public safety (PS) radio and transmitted by the radio to a server for verification and analytics, such as the server 106 of FIG. 1. The verification may include authentication of the user of the device (user is who she/he purports to be). The verification may further include a score check, the score check being based on historical data on past boundary violations (e.g. number of violations, severity level, time between violations) associated with the user/device and previously stored within a database associated with the server from past incident scene analytics. If the press credentials are determined to be acceptable by the server, then the non-PS device and press credentials are temporality registered with the server at 306, and the portable non-PS device is approved by the server for access to an approved zone of the public safety incident scene.

In cases where an electronic badge (passive device) was scanned, the verification and registration further includes registering the press agent's cell phone or other active device having parameters saved within the press credentials. In other words, a press agent cannot enter the incident scene based on an electronic badge alone and will further need to register a cell phone or other active device that can receive mapping and warning messages from the server.

The temporary registration may be uploaded to a cloud based server, such as server 106 of FIG. 1. The registration includes sending mapping information from the server to the portable non-PS communication device providing the approved zone(s) and keep-out zone(s) for the public safety incident scene. The registration includes granting permissions to the server to monitor the location of the temporarily registered device while the device is operating within the public safety incident scene.

At 308, the method continues with determining if a location of the temporarily registered device has crossed over a boundary into a keep-out zone of the public safety incident scene, and if so, to send a boundary waning alert to the temporarily registered device with instructions to relocate to the approved zone of the public safety incident scene. Public safety authorities may be alerted at 312 of the warning being generated.

Figure 4:
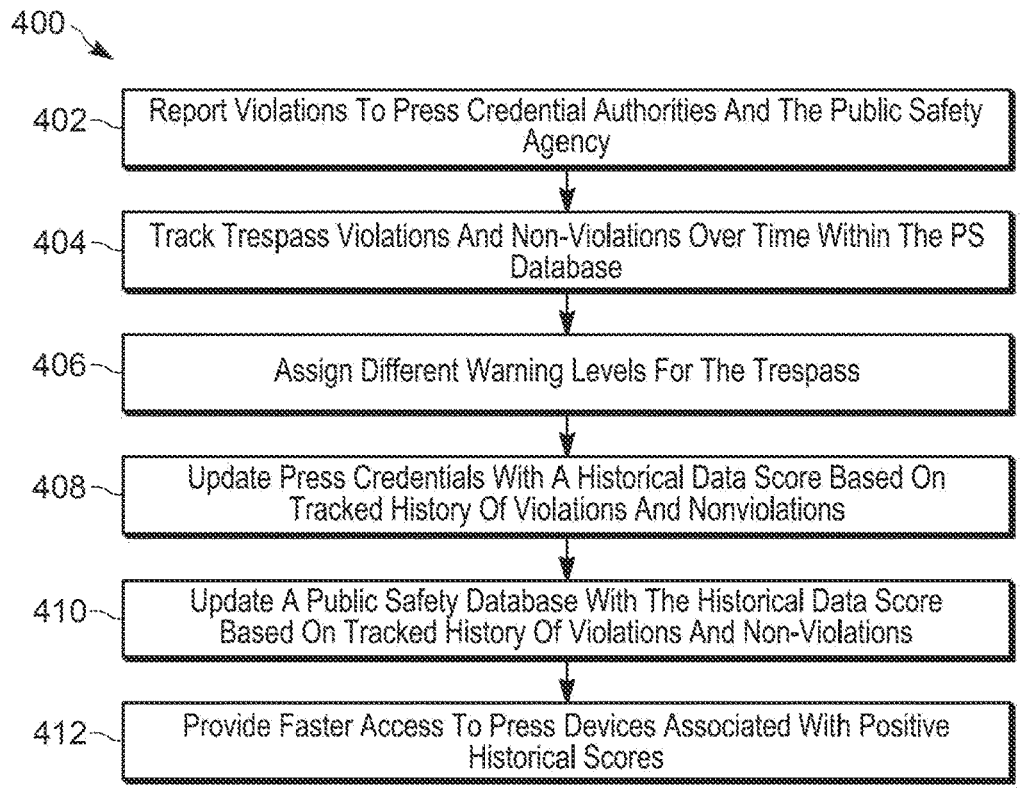
FIG. 4 is a flowchart for updating access to a public safety incident scene in accordance with some embodiments.

FIG. 4 is a flowchart for a method 400 of updating access to a public safety incident scene in accordance with some embodiments. The method begins at 402, by reporting boundary violations to press credential authorities and the public safety agency. The method further provides for tracking boundary violations and non-violations over time ay 406 and storing within the public safety database. The method continues at 406 with assigning different warning levels for different boundary violations, based on boundary violation data including, for example number of violations, severity of the violation. For example, the warning level may be assigned based on location outside of the approved boundary and time outside of the approved boundary. The method continues at 408 with updating press credentials with a historical data score based on the tracked history of violations and non-violations, and updating a database with the historical press pass score. The scores can be applied at 412 to provide faster access to devices associated with positive historical scores. For example, reporters that with low or no-violations will get preferred access to future incident scenes over those with lesser scores. The methods 300, 400 enable press and public safety agencies to electronically interoperate in a manner that promotes a cooperative relationship.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for press and public safety agencies to interoperate, comprising:
   presenting an electronic press pass having electronic press credentials stored therein upon entry to a public safety incident scene, the electronic press pass being associated with a portable non-public safety (non-PS) communication device;
   scanning the electronic press pass, using a scanning function of a portable public safety (PS) radio; verifying, by a server, that the electronic press credentials are acceptable for access to an approved zone of the public safety incident scene;
   temporarily registering the portable non-PS communication device and electronic press credentials with the server for access to the approved zone as a temporarily registered device;
   determining, by the server, that a location of the temporarily registered device has crossed a boundary into a keep-out zone of the public safety incident scene; and
   sending a boundary warning from the server to the temporarily registered device with instructions to relocate to the approved zone.

2. The method of claim 1, further comprising:
   alerting the portable PS radio, by the server, that the boundary warning has been sent to the temporarily registered device.

3. The method of claim 1, wherein the electronic press pass comprises an electronic badge having the electronic press credentials stored therein, and the portable non-PS communication device comprises one of: a cell phone, tablet or laptop.

4. The method of claim 1, wherein the electronic press pass with electronic press credentials is stored directly within the portable non-PS communication device, and the portable non-PS comprises on of: a cell phone, a tablet, or laptop.

5. The method of claim 1, wherein temporarily registering further comprises:
   granting permissions to the server to monitor the location of the temporarily registered device while the temporarily registered device is operating within the public safety incident scene.

6. The method of claim 1, further comprising:
   monitoring, by the server, a location of the temporarily registered device having the electronic press credentials.

7. The method of claim 1, further comprising:
   alerting the portable PS radio of the boundary warning sent to the temporality registered device.

8. The method of claim 1, further comprising:
   alerting the portable PS radio of the boundary warning sent to the temporality registered device, along with a recommendation action based on a severity level of the boundary warning.

9. The method of claim 1, further comprising:
   tracking boundary violations and non-violations over time using the server; and
   storing analytics on the tracked boundary violations and non-violations within a public safety database associated with the server.

10. The method of claim 1, further comprising:
    assigning different warning levels for each boundary violation.

11. The method of claim 10, wherein the warning level are based on time of the temporarily registered device inside the keep-out zone.

12. The method of claim 1, further comprising:
    updating the electronic press credentials with a historical data score based on a tracked history of violations and non-violations.

13. The method of claim 12, further comprising:
    updating a public safety database with the historical data score based on tracked history of violations and non-violations.

14. The method of claim 1, wherein verifying further comprises:
    verifying, by the server, that the electronic press credentials are acceptable, based on a historical press pass score, for access to the approved zone of the public safety incident scene.

15. The method of claim 1, wherein the public safety incident scene is electronically mapped showing the approved zone and the keep-out zone separated by a boundary.

16. The method of claim 15, further comprising:
    communicating an updated boundary to the temporarily registered device.

* * * * *